INVENTOR.
BERNARD L. STEIERMAN

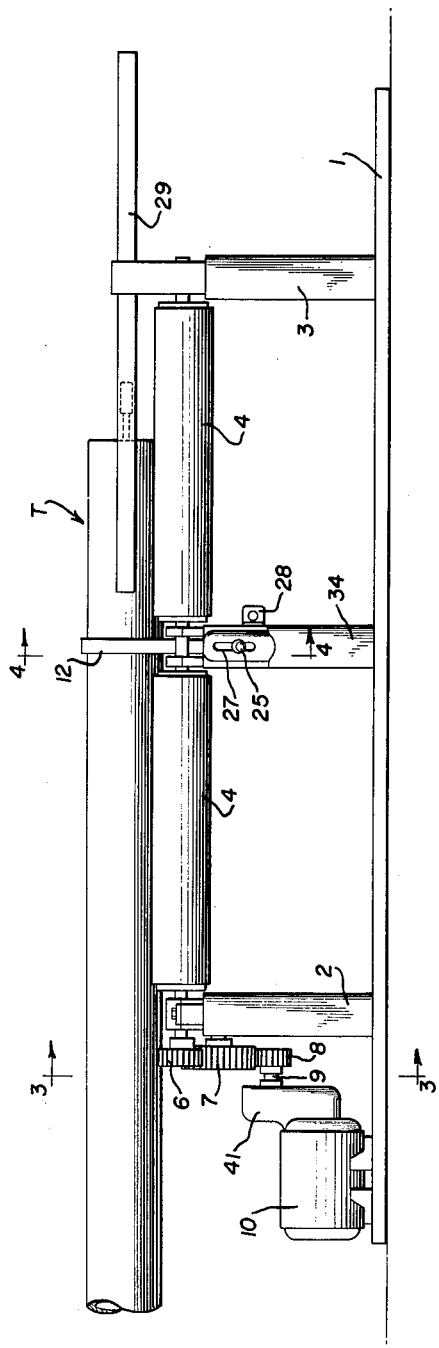

United States Patent Office 3,084,431
Patented Apr. 9, 1963

1

3,084,431
GLASS ROD AND TUBE CUTTER
Bernard L. Steierman, Toledo, Ohio, assignor to Owens-Illinois Glass Company, a corporation of Ohio
Filed Dec. 30, 1959, Ser. No. 862,819
5 Claims. (Cl. 30—164.9)

This invention relates to an improved glass severing means. More specifically this invention relates to an improved machine for scoring and cutting glass tubes and rods of various lengths.

Cutting means for the above general purpose are well known. However, it has been noted that tube cutting devices tend to form heels on each of the severed sections such that a further process of firepolishing is necessitated.

Accordingly it is a primary object of this invention to provide a novel glass severing apparatus in which a clean severance of the glass rod or tube occurs. A further object of this invention is to provide a glass tube and rod cutting device which will obviate the need of further processing of the severed sections of glass tubes or rods. A still further object of this invention is to provide a cutting apparatus for glass tubes and rods in which stress and strain areas in the vicinity of the severed tubes or rods are minimized. These and other objects will be apparent from the description which follows.

The novel apparatus of this invention consists of a plurality of cutters resiliently and circumferentially mounted about the glass tube or rod to be cut and means for supporting and rotating the glass tube or rod in operative position with said cutters such that each cutter contacts the tube or rod with substantially equal force and depth.

The invention consists of the means hereinafter more fully described, claimed, and shown in the accompanying drawings in which:

FIGURE 1 is a front elevation of the glass cutter of this invention.

FIGURE 2 is a top plan view of FIGURE 1.

Figure 3:
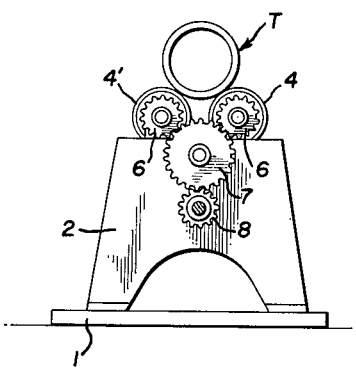
FIGURE 3 is a sectional view taken on line 3—3 of FIGURE 1.
Figure 5:
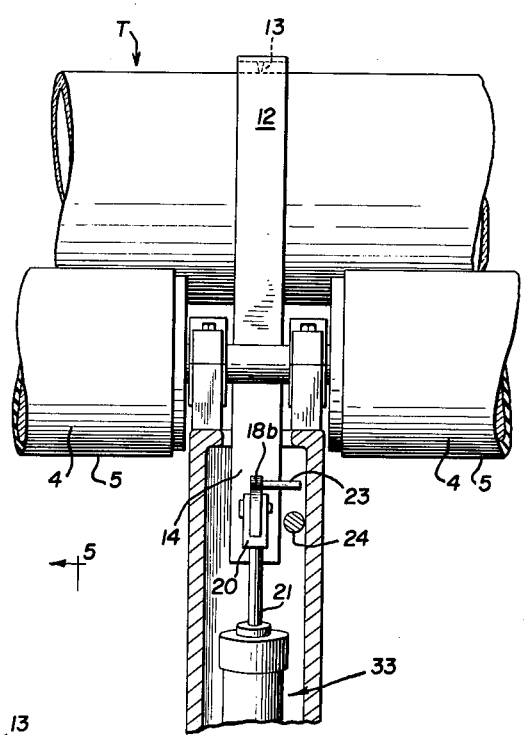
FIGURE 5 is a sectional view taken on line 5—5 of FIGURE 4.
Figure 4:
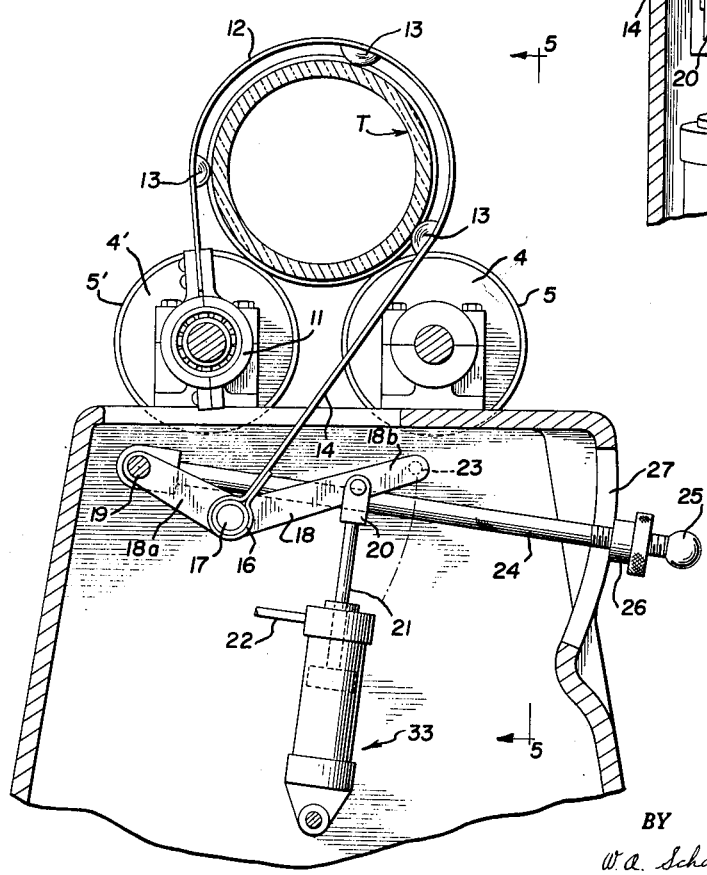
FIGURE 4 is an enlarged sectional view taken on line 4—4 of FIGURE 1.

With reference to the annexed drawings the novel glass cutting apparatus of this invention contemplates a supporting base 1 and wall-like uprights 2 and 3 spaced from each other. Journaled between the uprights 2, 3, and 34 are sectional spaced parallel rollers 4 and 4' whose peripheries 5 and 5', respectively, are provided with resilient material, preferably a plastic such as rubber or the like.

The ends of the rollers 4 and 4' are provided with gears 6 which engage an idle gear 7 that meshes with gear 8 mounted on shaft 9 driven by motor 10. A gear reduction until 41 is provided between shaft 9 and motor 10.

Attached in non-rotational engagement to spaced roller 4' is one end 11 of an incompletely annular spring 12, which by its very nature is inherently self-sustaining, having three or more equally spaced cutters 13 of tungsten carbide mounted thereon. The other end 14 of the spring is attached to a linkage arrangement by connector 16 which is free to move around shaft 17 connected to V-shaped lever 18 whose one end 18a is free to move about a rock shaft 19. Near the other end 18b of V-shaped lever 18 is a pivotally secured yoke 20 of piston rod 21 of a reciprocally actuated power means 33 which is shown as a hydraulic member having an inlet 22 connected to a source of actuation (not shown) by control

2 means 28. At the far end of lever 18b is a projecting stop bar 23 which engages an adjusting rod 24 mounted at one end on rock shaft 19 and having a handle 25 with a set screw 26 for setting adjusting rod 24 at any desired position in slot opening 27.

Supported by upright 3 is a bar like member 29 on which is mounted an adjustable calibrated means 30 slidably mounted on bar 29 for determining the length of each tube or rod to be cut consisting of a contacting member or stop 31 and adjustable locking lever 32.

With the foregoing apparatus a glass tube T can be cleanly severed by placing the same on rollers 4, which will frictionally engage the same. The glass tube T is then advanced until it engages pre-determined stop 31. Depending upon whether scoring or cutting is desired, adjusting rod 24 will be appropriately positioned by means of set screw 26 and handle 25 with respect to projecting stop 23. Upon contacting control means 28, piston 21 will pull lever end 18b down until stop 23 engages adjusting bar 24 which in turn will cause connector 16 to pull spring 12 with cutter 13 against tube T to a scoring or cutting depth depending upon the position of adjusting rod 24.

From the above description it will be apparent that there has been provided an improved apparatus for effecting clean and rapid severing of glass rods and tubes of varying length. It will be noted that in operating the cutting apparatus of this invention that the glass tube or rod may be fed into the apparatus from left to right with rollers 4 and 4' in operative or inoperative position. In the latter instance the rollers 4 and 4' may be engaged just prior to the actuation of cutters 13 in contact with the tube or rod. Where three cutters 13 are employed, the glass rod or tube need be rotated only a little more than ⅓ revolution to effect a complete scoring or cutting. However, depending on the thickness of the tubing and whether scoring or cutting is desired, the glass rod or tube may be rotated more than once, if desired, with the cutters 13 in contact with the glass tube T.

It will be evident that numerous modifications may be made wherein the principle of the present invention may be employed provided the features set forth in any of the following claims are utilized. For example, it will be evident that other power actuating means such as a solenoid may be substituted for the hydraulic means 21 shown. In addition various cutters may be used other than the tungsten carbide crystals 13 shown, such as diamond crystals or cutting wheels. Moreover, the control means 28 can be designed to control not only the hydraulic means 21, as shown and described, but can be coupled with the electric motor 10 in a synchronized manner whereby the rollers 4 and 4' and power means 21 can be brought into operational position simultaneously. As illustrated it is contemplated that the electric motor 10 and power means 21 will be independently controlled. Also it will be noted that the drawings show member T as a glass tubing, but it is to be understood that the apparatus is equally effective for cutting glass rods. Furthermore, the use of four or more cutters 13 is contemplated by the apparatus of this invention although only three are shown in the drawings. It will also be evident that means other than stop element 31 can be employed for setting the length of tube or rod to be cut. Although the resilient peripheries 5 and 5' of rollers 4 and 4' are designed to grip the glass tube or rod to effect its rotation, it is evident to one skilled in the art that other devices such as a collet or chuck means can be provided for the purpose of rotating the glass tube or rod. In addition the electric motor 10 can be replaced by a hydraulic or other suitable power means, if desired. Further modifications of the disclosed invention will be apparent to those skilled in the art. Although the invention may be modified or practiced otherwise than as specifically described, it is intended that the invention is to be limited only by the scope of the appended claims as construed in terms of the disclosure set forth above.

What I claim is:

1. Apparatus for severing elongated glass stock comprising a supporting base, a self-sustaining incompletely annular resilient member supported by said base and having two ends of attachment, a plurality of cutting members mounted on said resilient member, means attached to one end of the resilient member to hold said end in relatively fixed position, and means attached to the other end of said resilient member capable of alternately decreasing and increasing the circumference of said resilient member.

2. Apparatus for severing elongated glass stock comprising a supporting base, a self-sustaining incompletely annular resilient member supported by said base and having two ends of attachment, a plurality of cutting members mounted on said resilient member, means for centrally positioning said glass stock in operative cutting position within said resilient member, means attached to one end of the resilient member to hold said end in relatively fixed position, and means attached to the other end of said resilient member capable of alternately decreasing and increasing the circumference of said resilient member.

3. Apparatus for severing elongated glass stock comprising a supporting base, a self-sustaining incompletely annular resilient member supported by said base and having two ends of attachment, a plurality of cutting members mounted on said resilient member, spaced elongated glass stock supporting rollers rotatable about parallel axes, means attached to one end of the resilient member to hold said end in relatively fixed position, and means attached to the other end of said resilient member capable of alternately decreasing and increasing the circumference of said resilient member.

4. Apparatus for severing elongated glass stock comprising a supporting base, a self-sustaining incompletely annular resilient member supported by said base and having two ends of attachment, a plurality of cutting members mounted on said resilient member, spaced elongated glass stock supporting rollers rotatable about parallel axes, a motor for rotating the rollers, means attached to one end of the resilient member to hold said end in relatively fixed position, and means attached to the other end of said resilient member capable of alternately decreasing and increasing the circumference of said resilient member.

5. Apparatus for severing elongated glass stock comprising a supporting base, a self-sustaining incompletely annular resilient member supported by said base and having two ends of attachment, a plurality of cutting members mounted on said resilient member, spaced elongated glass stock supporting rollers rotatable about parallel axes, a motor for rotating the rollers, means attached to one end of the resilient member to hold said end in relatively fixed position, means for adjusting the depth of the cutting to be effected by the cutting members, and means attached to the other end of said resilient member capable of alternately decreasing and increasing the circumference of said resilient member.

References Cited in the file of this patent

UNITED STATES PATENTS

| | | |
|---|---|---|
| 1,765,208 | Cunningham | June 17, 1930 |
| 1,922,426 | Fahrney | Aug. 15, 1933 |

FOREIGN PATENTS

| | | |
|---|---|---|
| 681,040 | Germany | Sept. 12, 1939 |